(12) United States Patent
Lee et al.

(10) Patent No.: US 9,058,091 B2
(45) Date of Patent: Jun. 16, 2015

(54) INPUT DEVICE AND INPUT METHOD

(75) Inventors: Hyun Jeong Lee, Seoul (KR); Wook Chang, Seoul (KR); Seung Ju Han, Seoul (KR); Joon Ah Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1017 days.

(21) Appl. No.: 12/453,356

(22) Filed: May 7, 2009

(65) Prior Publication Data

US 2010/0141611 A1      Jun. 10, 2010

(30) Foreign Application Priority Data

Dec. 9, 2008    (KR) .................. 10-2008-0124714

(51) Int. Cl.
 *G06F 3/0346* (2013.01)
 *G06F 3/0481* (2013.01)
 *G06F 3/033* (2013.01)
 *G06F 3/0484* (2013.01)
 *G06F 3/0488* (2013.01)

(52) U.S. Cl.
 CPC ............ *G06F 3/04815* (2013.01); *G06F 3/033* (2013.01); *G06F 3/04847* (2013.01); *G06F 3/0488* (2013.01)

(58) Field of Classification Search
 CPC .............. G06F 3/0346; G06F 3/04815; G06F 2200/1636; G06F 3/0488; G06F 3/0338; G06F 3/03547; G06K 9/224
 USPC ......................................... 345/156–169, 173
 See application file for complete search history.

(56) References Cited

U.S. PATENT DOCUMENTS

| | | | |
|---|---|---|---|
| 5,757,360 A * | 5/1998 | Nitta et al. ..................... | 345/158 |
| 6,597,347 B1 * | 7/2003 | Yasutake ....................... | 345/173 |
| 2006/0250353 A1* | 11/2006 | Yasutake ....................... | 345/156 |
| 2007/0146325 A1* | 6/2007 | Poston et al. ................. | 345/163 |
| 2009/0278812 A1* | 11/2009 | Yasutake ....................... | 345/173 |

FOREIGN PATENT DOCUMENTS

| | | |
|---|---|---|
| JP | 3243770 | 1/1995 |
| JP | 09-218744 | 8/1997 |
| JP | 2001-331274 | 11/2001 |
| JP | 2003-131804 | 5/2003 |
| JP | 2005-084006 | 3/2005 |
| JP | 2007-148518 | 6/2007 |
| JP | 2008-146619 | 6/2008 |
| KR | 10-2006-0069985 | 6/2006 |

OTHER PUBLICATIONS

Korean Office Action dated Jul. 30, 2014 in corresponding Korean Patent Application No. 10-2008-0124714, 8 pages.

* cited by examiner

*Primary Examiner* — Kevin M Nguyen
(74) *Attorney, Agent, or Firm* — Harness, Dickey & Pierce, P.L.C.

(57) ABSTRACT

Provided is an input device that may sense a first contact occurring along a planar coordinate axis among three-dimensional (3D) spatial coordinate axes to generate first contact information, to sense a second contact occurring along a vertical coordinate axis among the 3D spatial coordinate axes to generate second contact information, to analyze contact information including at least one of the first contact information and the second contact information to generate an input signal to control a predetermined display device, and to transmit the generated input signal to the display device. The display device may control an object that is displayed on the display device, based on the input signal.

20 Claims, 11 Drawing Sheets

320

|  |  |  |
|---|---|---|
| MOVE FORWARD 321 | MAINTAIN FORWARD STATE 325 | YAW RIGHT 328 |
|  |  |  |
| MOVE BACKWARD 322 | MOVE RIGHT 326 | MAINTAIN LEFT-YAW STATE 329 |
|  |  |  |
| FLY ON OR HEIGHT UP 323 | FLY OFF OR HEIGHT DOWN 327 | PITCH UP 330 |
|  |  |  |
| MAINTAIN FLY-OFF OR HEIGHT-DOWN STATE 324 |  | ROLL RIGHT 331 |

| | | | |
|---|---|---|---|
| MOVE FORWARD 421 | XY XZ YZ | MOVE LEFT 425 | XY XZ YZ |
| MOVE BACKWARD 422 | XY XZ YZ | MOVE RIGHT 426 | XY XZ YZ |
| FLY ON OR HEIGHT UP 423 | XY XZ YZ | YAW 427 | XY XZ YZ |
| FLY OFF OR HEIGHT DOWN 424 | XY XZ YZ | ROLL 428 | XY XZ YZ |
| | | PITCH 429 | XY XZ YZ |

| | | | |
|---|---|---|---|
| MOVE FORWARD 521 |  | MOVE LEFT 525 |  |
| MOVE BACKWARD 522 |  | MOVE RIGHT 526 |  |
| FLY ON OR HEIGHT UP 523 |  | YAW 527 |  |
| FLY OFF OR HEIGHT DOWN 524 |  | ROLL 528 |  |
| | | PITCH 529 |  |

520

INPUT DEVICE AND INPUT METHOD

CROSS-REFERENCE TO RELATED APPLICATIONS

This application claims the priority benefit of Korean Patent Application No. 10-2008-0124714, filed on Dec. 9, 2008, in the Korean Intellectual Property Office, the disclosure of which is incorporated herein by reference.

BACKGROUND

1. Field

Exemplary embodiments relate to an input device and an input method. More particularly, exemplary embodiments relate to an input device and an input method that may provide a user with an intuitive input interface and thereby enable the user to more readily manipulate an object displayed on a display device.

2. Description of the Related Art

Currently, the release of various types of information devices increases users' interests regarding various types of input devices that may control the information devices.

Generally, a mouse, a keyboard, and the like are being used in a computer and the like as an input device.

The input device such as the mouse may provide an input interface based on a Graphic User Interface (GUI) and thus may be readily used among many users using an information device such as the computer.

However, existing input devices may be generally appropriate for a command line interface or a two-dimensional (2D) GUI. Therefore, a user that is unfamiliar with a latest information device, for example, a child, an old and feeble person, and the like, may have difficulties in using the input devices.

In particular, as a three-dimensional (3D) game or 3D Internet is being currently generalized, there is an increasing heed for an input device that may control an object that is displayed on a virtual 3D space.

However, since the existing input devices are manufactured based on the 2D input interface, they may be inappropriate for controlling the object in the virtual 3D space.

Accordingly, there is a need for a research regarding an input device that may provide a user with a convenient interface in a virtual 3D space.

SUMMARY

According to exemplary embodiments, there may be provided an input device including: a first contact sensor to sense a first contact occurring along a planar coordinate axis among three-dimensional (3D) spatial coordinate axes and to generate first contact information; a second contact sensor to sense a second contact occurring along a vertical coordinate axis among the 3D spatial coordinate axes; and an input signal generator to analyze contact information including at least one of the first contact information and the second contact information, and to generate an input signal to control a predetermined display device.

Here, the input device may further include a transmitter to transmit the generated input signal to the display device. The transmitted input signal may control an object that is displayed on the display device.

According to exemplary embodiments, there may be provided an input method including: sensing a first contact occurring along a planar coordinate axis among 3D spatial coordinate axes to generate first contact information; sensing a second contact occurring along a vertical coordinate axis among the 3D spatial coordinate axes; and analyzing contact information including at least one of the first contact information and the second contact information to generate an input signal to control a predetermined display device, wherein the method may be performed by using at least one processor.

Here, the input method may further include transmitting the generated input signal to the display device. The transmitted input signal may control an object that is displayed on the display device.

Additional aspects of exemplary embodiments will be set forth in part in the description which follows and, in part, will be apparent from the description, or may be learned by practice of the disclosure.

BRIEF DESCRIPTION OF THE DRAWINGS

These and/or other aspects of exemplary embodiments will become apparent and more readily appreciated from the following description, taken in conjunction with the accompanying drawings of which:

FIGS. 4A and 4B illustrate an input device and examples for describing an operation of the input device according to other exemplary embodiments;

DETAILED DESCRIPTION

Figure 1:
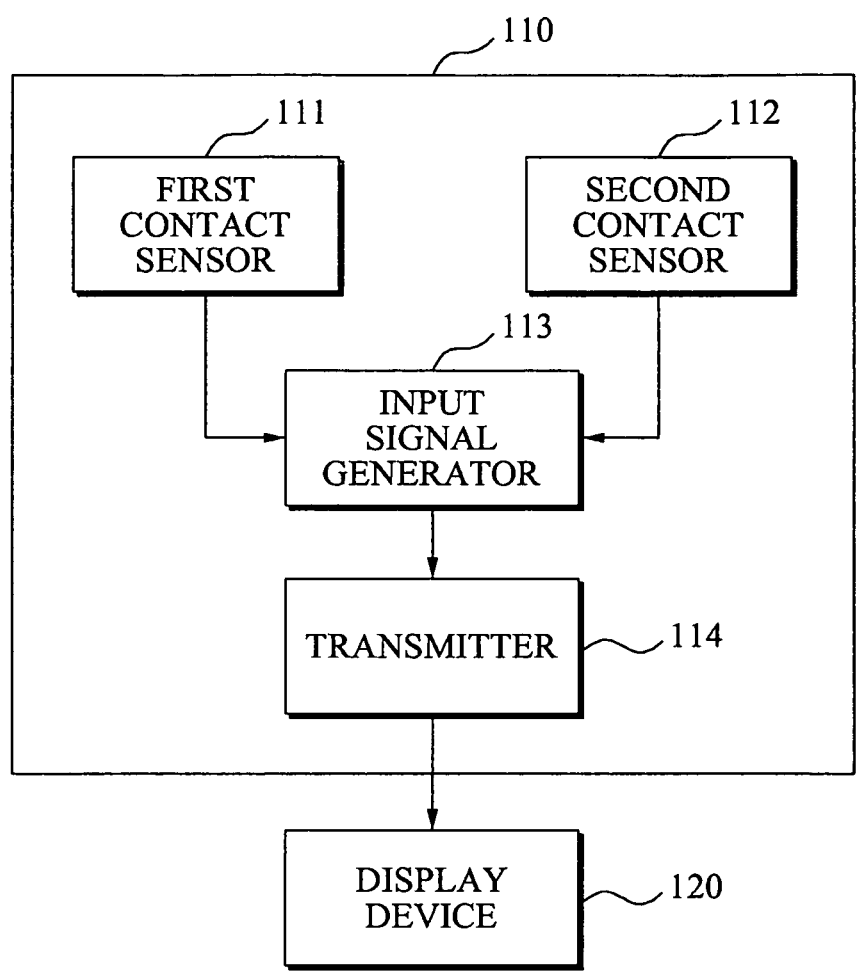
FIG. 1 is a block diagram illustrating a configuration of an input device according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a block diagram illustrating a configuration of an input device 110 according to exemplary embodiments.

FIG. 1 illustrates the input device 110 and a display device 120.

The input device 110 may include a first contact sensor 111, a second contact sensor 112, an input signal generator 113, and a transmitter 114.

The first contact sensor 111 may sense a first contact occurring along a planar coordinate axis among three-dimensional (3D) spatial coordinate axes and generate first contact information.

The second contact sensor 112 may sense a second contact occurring along a vertical coordinate axis among the 3D spatial coordinate axes.

According to exemplary embodiments, the input device 110 may further include a validity decision unit (not show) to determine whether the first contact information and the second contact information are valid contact information.

The input signal generator 113 may analyze contact information including at least one of the first contact information and the second contact information, and generate an input signal with respect to a predetermined display device.

According to exemplary embodiments, the input signal generator 113 may include a motion information generator (not shown) to generate motion information associated with a motion of the object from the contact information, by referring to a table including at least one predetermined motion information.

Here, the input signal may include the motion information.

According to exemplary embodiments, the motion information generator may estimate the motion of the object by tracking at least one location of a location of the first contact and a location of the second contact at predetermined time intervals based on the contact information and generate the motion information from the estimated motion of the object, by referring to the table.

The transmitter 114 may transmit the generated input signal to the display device 120.

In this instance, the transmitted input signal may control an object that is displayed on the display device 120. Specifically, when the display device 120 receives the input signal from the input device 110, the display device 120 may control the object, displayed on the display device 120, based on the input signal.

Hereinafter, an operation of the input device 110 according to exemplary embodiments will be described in detail.

Figure 2:
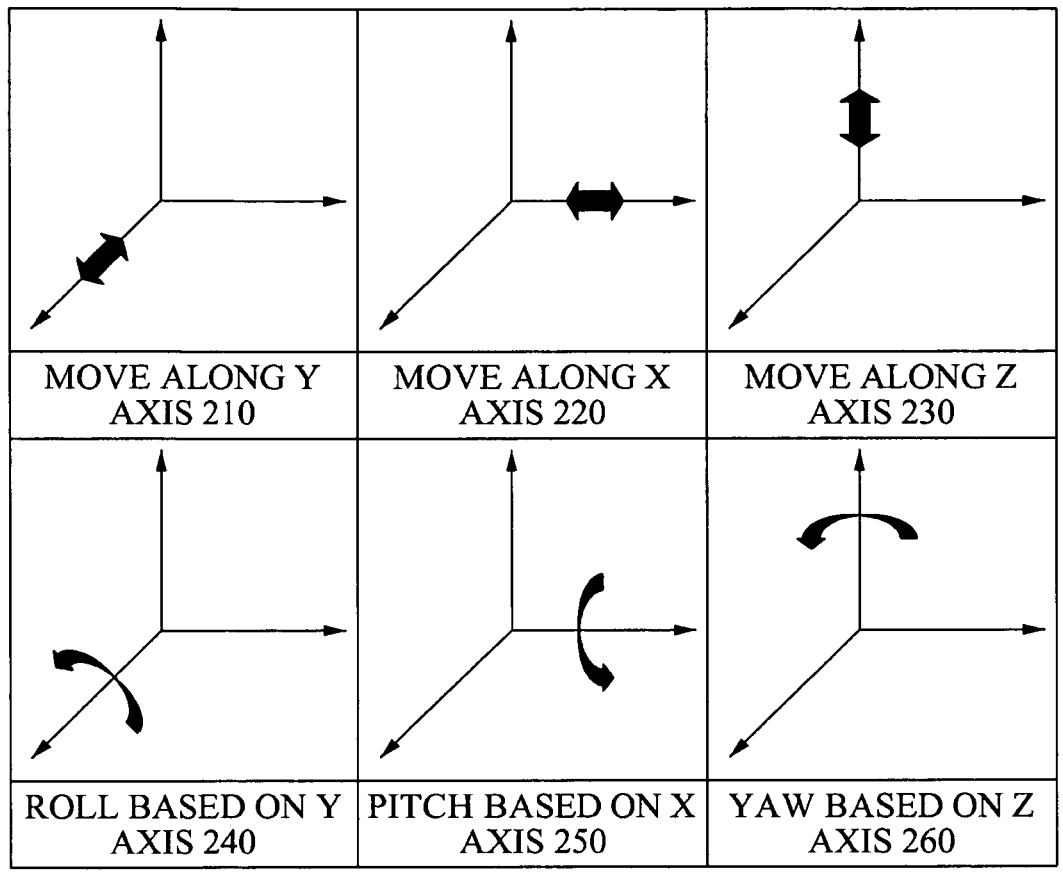
FIG. 2 illustrates examples of motion types of an object controllable via an input device according to exemplary embodiments.

FIG. 2 illustrates examples of motion types of an object controllable via the input device 110 of FIG. 1 according to exemplary embodiments.

Here, it is assumed that an object displayed on the display device 120 is an avatar existing in a virtual 3D space and a user manipulates the avatar via the input device 110.

Since the avatar exists in the virtual 3D space, the avatar may exhibit various types of motions on virtual 3D spatial axes as shown in FIG. 2.

As shown in FIG. 2, the avatar may have 6 degrees of freedom (DOF) in the virtual 3D space.

The first contact sensor 111 may sense a first contact occurring along a planar coordinate axis among the 3D spatial coordinate axes and generate first contact information.

For example, as shown in images 210 and 220, when the user desires to move the avatar along a Y axis or along an X axis, the user may manipulate the avatar via the first contact sensor 111.

Specifically, the first contact sensor 111 may sense a first contact occurring along a planar coordinate axis, for example, the X axis and the Y axis among the 3D spatial coordinate axes, and thereby enable the user to perform a 2D manipulation of the avatar to move the avatar along the Y axis or the X axis. That is, the user may perform a motion on the XY plane for manipulation of the avatar, the manipulation of the avatar being caused by sensing the first contact occurring along the coordinate axis, and by combining signals associated with the sensed first contact.

The second contact sensor 112 may sense a second contact occurring along a vertical coordinate axis among the 3D spatial coordinate axes and generate second contact information.

For example, as shown in an image 230, when the user desires to move the avatar along a Z axis, the user may manipulate the avatar via the second contact sensor 112.

Specifically, the second contact sensor 112 may sense the second contact occurring along the vertical coordinate axis, that is, the Z axis, among the 3D spatial coordinate axes and thereby enable the user to move the avatar along the Z axis.

Also, as shown in images 240, 250, and 260, when the user causes a first contact or a second contact to occur on the first contact sensor 111 and the second contact sensor 112 in order to make the avatar roll based on the Y axis, to make the avatar pitch based on the X axis, or to make the avatar yaw based on the Z axis, the first contact sensor 111 and the second contact sensor 112 may sense the first contact or the second contact to generate first contact information or second contact information.

For example, as shown in the image 260, in order to make the avatar yaw based on the Z axis on the plane consisting of the X axis and the Y axis, the user may cause the first contact to occur in a circular form on the first contact sensor 111.

According to exemplary embodiments, the input device 110 may further include a validity decision unit (not shown) to determine whether the first contact information and the second contact information are valid contact information.

The input signal generator 113 may analyze contact information including at least one of the first contact information and the second contact information, and generate an input signal with respect to the display device 120.

For example, as shown in the image 210, when the user causes a first contact along the Y axis to occur on the first contact sensor 111 in order to move the avatar along the Y axis, the first contact sensor 111 may sense the first contact to generate first contact information.

The input signal generator 113 may analyze the first contact information to generate an input signal to be transmitted to the display device 120.

Also, as shown in the image 230, when the user causes a second contact along the Z axis to occur on the second contact sensor 112 in order to move the avatar along the Z axis, the second contact sensor 112 may sense the second contact to generate second contact information.

The input signal generator 113 may analyze the second contact information to generate the input signal to be transmitted to the display device 120.

When the user causes the first contact and the second contact to simultaneously occur on the first contact sensor 111 and the second contact sensor 112, the input signal generator 113 may analyze the first contact information and the second contact information to generate the input signal. Here, the input signal may include motion information that may be used to make the avatar exhibit a predetermined motion in a virtual 3D space.

For example, when the user causes a first contact to occur on the first contact sensor 111 to make the avatar yaw based on the Z axis, and causes a second contact to occur on the second contact sensor 112 for a movement along the Z axis, the input signal generator 113 may analyze first contact information and second contact information to generate an input signal. Here the input signal may include motion information that may be used to make the avatar move along the Z axis while yawing based on the Z axis.

According to exemplary embodiments, the input signal generator 113 may further include a motion information generator (not shown) to generate motion information associated with a motion of the object from contact information, by referring to a table including at least one predetermined motion information. Here, the contact information may include at least one of the first contact information and the second contact information.

The input signal may include the motion information.

For example, when the user causes a first contact to occur on the first contact sensor 111 for a movement along the Y axis, the motion information generator may generate motion information associated with making the avatar move along the Y axis from the first contact information, by referring to the table including the at least one motion information.

Also, according to exemplary embodiments, the motion information generator may estimate the motion of the avatar by tracking at least one location of a location of the first contact and a location of the second contact at predetermined time intervals based on the contact information, and generate the motion information from the estimated motion of the object, by referring to the table.

For example, when the user causes the second contact to occur on the second contact sensor 112 for the movement along the Z axis, the motion information generator may track the location of the second contact at the predetermined time intervals based on the second contact information.

The motion information generator may estimate the motion of the avatar based on a location tracking result of the second contact. For example, the motion information generator may estimate the motion of the avatar as the movement along the Z axis.

The motion information generator may extract motion information associated with a motion similar to the estimated motion of the avatar from at least one motion information of the avatar, by referring to the table including the at least one motion information, to thereby generate the motion information associated with the avatar. For example, since the motion information generator estimates the motion of the avatar as the movement along the Z axis, the motion information generator may extract motion information associated with the movement of the avatar along the Z axis as shown in the image 230 to thereby generate the motion information associated with the avatar.

Once the input signal generator 113 generates the input signal, the transmitter 114 may transmit the input signal to the display device 120.

When the display device 120 receives the input signal, the display device 120 may control the avatar that is displayed on the display device 120 based on the input signal.

Hereinafter, various exemplary embodiments of the input device 110 will be described with reference to FIGS. 3 through 5.

Figure 3A:
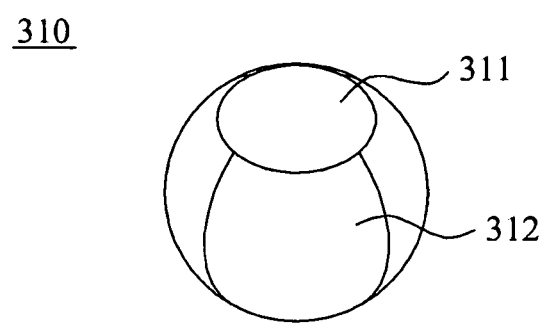
FIGS. 3A and 3B illustrate an input device and examples for describing an operation of the input device according to exemplary embodiments.
Figure 3B:
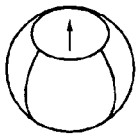
Figure 3B:
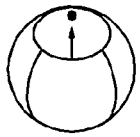
Figure 3B:
Figure 3B:
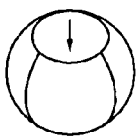
Figure 3B:
Figure 3B:
Figure 3B:
Figure 3B:
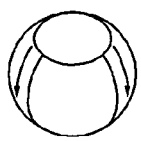
Figure 3B:
Figure 3B:
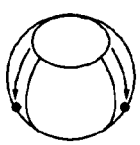
Figure 3B:
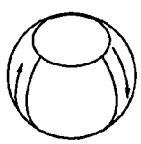

FIGS. 3A and 3B illustrate an input device 310 and examples for describing an operation of the input device 310 according to exemplary embodiments.

FIG. 3A illustrates a structure of the input device 310 according to exemplary embodiments, and FIG. 3B illustrates motion types 320 of an object controllable via the input device 310.

As shown in FIG. 3A, the input device 310 may be constructed in a spherical shape. A first contact sensor 311 may be constructed by forming an upper portion of the spherical shape to be planar. A second contact sensor 312 may be formed as a side surface of the spherical shape.

Hereinafter, a process where a user manipulates, via the input device 310, an object displayed on a displayed device will be described in detail with reference to FIG. 3B.

The input device 310 may include a sensor capable of sensing multiple simultaneous touches in order to recognize a contact motion on its surface. Specifically, the input device 310 may include a sensor that may recognize a multi-touch gesture over its entire surface that is directly connected to the first contact sensor 311 and the second contact sensor 312.

The input device 310 may include a multi-sensor that may attach a sensor node along an inner curved surface of a housing to thereby sense a touch signal. The multi-sensor may be a non-contact sensor, for example, a dielectric sensor, but is not limited thereto.

Here, it is assumed that an object displayed on the display device is an avatar existing in a virtual 3D space and a user manipulates the avatar via the input device 310.

As shown in an image 321, when the user desires to make the avatar move forward, the user may cause a first contact to occur as indicated by an arrow indicator with respect to the first contact sensor 311.

Specifically, the user may cause a bottom-to-top contact to occur using a finger and the like on the first contact sensor 311.

In this case, the first contact sensor 311 may sense the first contact to generate first contact information.

According to exemplary embodiments, the input device 310 may further include a validity decision unit (not shown) to determine whether the first contact information is valid contact information.

An input signal generator (not shown) may analyze the first contact information to generate an input signal with respect to the display device.

According to exemplary embodiments, the input signal generator may further include a motion information generator (not shown).

The motion information generator may estimate a motion of the avatar as a motion of moving forward by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, a transmitter (not shown) may transmit the input signal to the display device.

The display device may control the motion of the avatar based on the input signal, so that the avatar may move forward.

As shown in an image 322, when the user desires to make the avatar move backward, the user may cause a first contact to occur as indicated by an arrow indicator with respect to the first contact sensor 311.

Specifically, the user may cause a top-to-bottom contact to occur on the first contact sensor 311 using a finger and the like.

In this case, the first contact sensor 311 may sense the first contact to generate first contact information.

The validity decision unit may determine whether the first contact information is valid contact information.

When the first contact information is determined to be the valid contact information, the input signal generator may analyze the first contact information to generate an input signal with respect to the display device.

The motion information generator may estimate a motion of the avatar as a motion of moving backward by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may move backward.

As shown in an image 323, when the user desires to make the avatar exhibit a fly-on or height-up motion, the user may cause a second contact to occur as indicated by arrow indicators with respect to the second contact sensor 312.

Specifically, the user, using a finger and the like on the second contact sensor 312, may cause a contact of wrapping and sliding up to occur, from bottom to top on the input device 310.

In this case, the second contact sensor 312 may sense the second contact to generate second contact information.

The validity decision unit may determine whether the second contact information is valid contact information.

When the second contact information is determined to be the valid contact information, the input signal generator may analyze the second contact information to generate an input signal with respect to the display device.

The motion information generator may estimate a motion of the avatar as a fly-on or height-up motion by tracking a location of the second contact at predetermined time intervals based on the second contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may exhibit a fly-on or height-up motion.

As shown in an image 324, when the user desires to make the avatar maintain a fly-off or height-down motion, the user may cause a second contact to occur as indicated by arrow indicators with respect to the second contact sensor 312.

Specifically, the user, using a finger and the like on the second contact sensor 312, may cause a contact of wrapping and sliding down to occur, from top to bottom on the input device. In this instance, the user may maintain the above state without releasing the user's hold of the contact motion.

In this case, the second contact sensor 312 may sense the second contact to generate second contact information.

The validity decision unit may determine whether the second contact information is valid contact information.

When the second contact information is determined to be the valid contact information, the input signal generator may analyze the second contact information to generate an input signal with respect to the display device.

The motion information generator may estimate a motion of the avatar as a motion of maintaining a fly-off or height-down motion of the avatar by tracking a location of the second contact at predetermined time intervals based on the second contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may maintain its fly-off motion.

As shown in an image 325, when the user desires to make the avatar maintain a forward state, the user may cause a first contact to occur as indicated by an arrow indicator with respect to the first contact sensor 311.

Specifically, the user may cause a bottom-to-top contact to occur on the first contact sensor 311 using a finger and the like. In this instance, the user may maintain the above state without releasing the user's hold of the contact motion.

In this case, the first contact sensor 311 may sense the first contact to generate first contact information.

The validity decision unit may determine whether the first contact information is valid contact information.

When the first contact information is determined to be the valid contact information, the input signal generator may analyze the first contact information to generate an input signal with respect to the display device.

The motion information generator may estimate a motion of the avatar as a motion of maintaining the forward state by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may maintain the forward state.

Examples of various motion types of the avatar based on a contact type occurring on the first contact sensor 311 and the second contact sensor 312 have been described above.

However, in addition to the aforementioned examples, there may be various types of examples of the input device 310.

For example, as shown in images 326 through 331 of FIG. 3B, the input device 310 may control various types of motions of the avatar such as a motion of moving to the right, a height-down motion, a motion of yawing to the right, a motion of maintaining a left yaw, a motion of pitching up, a motion of rolling to the right, and the like according to a contact type occurring on the first contact sensor 311 and the second contact sensor 312.

Also, according to exemplary embodiments, when the first contact and the second contact simultaneously occur on the first contact sensor 311 and the second contact sensor 312, the input device 310 may control the motion of the avatar according to the first contact and the second contact.

For example, when the first contact with respect to the motion of moving forward occurs on the first contact sensor 311 and the second contact with respect to the fly-on or height-up motion occurs on the second contact sensor 312, the input signal generator may generate the input signal including motion information based on first contact information and second contact information. Here, the motion information may be used to make the avatar exhibit a fly-on motion while moving forward.

Figure 4A:
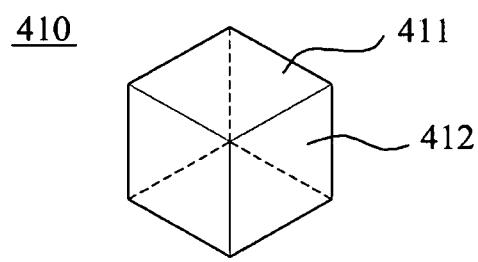

FIGS. 4A and 4B illustrate an input device 410 and examples for describing an operation of the input device 410 according to exemplary embodiments.

FIG. 4A illustrates a structure of the input device 410 according to exemplary embodiments, and FIG. 4B illustrates motion types 420 of an object controllable via the input device 410.

As shown in FIG. 4B, the input device 410 may be constructed in a hexahedral shape. A top surface, that is, an XY plane, of the hexahedral shape may be formed as a first contact sensor 411 may be constructed. A second contact sensor 412 may be formed as a side surface, that is, an XZ plane and a YZ plane, of the hexahedral shape.

Hereinafter, a process where a user manipulates, via the input device 410, an object displayed on a display device will be described in detail with reference to FIG. 4B.

Here, it is assumed that the object displayed on the display device is an avatar existing in a virtual 3D space and the user manipulates the avatar via the input device.

As shown in an image 421, when the user desires to make the avatar move forward, the user may cause a first contact to occur as indicted by an arrow indicator with respect to the first contact sensor 411.

Specifically, the user may cause a bottom-to-top contact to occur on the first contact sensor 311 using a finger and the like.

In this case, the first contact sensor 411 may sense the first contact to generate first contact information.

According to exemplary embodiments, the input device 410 may further include a validity decision unit (not shown) to determine whether the first contact information is valid contact information.

An input signal generator (not shown) may analyze the first contact information to generate an input signal with respect to the display device.

According to exemplary embodiments, the input signal generator may further include a motion information generator (not shown).

The motion information generator may estimate a motion of the avatar as a motion of moving forward by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, a transmitter (not shown) may transmit the input signal to the display device.

The display device may control the motion of the avatar based on the input signal, so that the avatar may move forward.

As shown in an image 422, when the user desires to make the avatar move backward, the user may cause a first contact to occur as indicated by an arrow indicator with respect to the first contact sensor 411.

Specifically, the user may cause a top-to-bottom contact to occur on the first contact sensor using a finger and the like.

In this case, the first contact sensor 411 may sense the first contact to generate first contact information.

The validity decision unit may determine whether the first contact information is valid contact information.

When the first contact information is determined to be the valid contact information, the input signal generator may analyze the first contact information to generate an input signal with respect to the display device.

The motion information generator may estimate a motion of the avatar as a motion of moving backward by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may move backward.

As shown in an image 423, when the user desires to make the avatar exhibit a fly-on or height-up motion, the user may cause a second contact to occur as indicated by an arrow indicator with respect to the second contact sensor 412.

Specifically, the user, using a finger and the like on the second contact sensor 412, may cause a contact of sliding up to occur, from bottom to top on the input device 410.

In this case, the second contact sensor 412 may sense the second contact to generate second contact information.

The validity decision unit may determine whether the second contact information is valid contact information.

When the second contact information is determined to be the valid contact information, the input signal generator may analyze the second contact information to generate an input signal with respect to the display device.

The motion information generator may estimate a motion of the avatar as a fly-on or height-up motion by tracking a location of the second contact at predetermined time intervals based on the second contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may exhibit a fly-on or height-up motion.

As shown in an image 424, when the user desires to make the avatar exhibit a fly-off or height-down motion, the user may cause a second contact to occur as indicated by an arrow indicator with respect to the second contact sensor 412.

Specifically, the user, using a finger and the like on the second contact sensor 412, may cause a contact of sliding down to occur, from top to bottom on the input device 410.

In this case, the second contact sensor 412 may sense the second contact to generate second contact information.

The validity decision unit may determine whether the second contact information is valid contact information.

When the second contact information is determined to be the valid contact information, the input signal generator may analyze the second contact information to generate an input signal with respect to the display device.

The motion information generator may estimate a motion of the avatar as a fly-off or a height-down motion by tracking a location of the second contact at predetermined time intervals based on the second contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may exhibit a fly-off motion.

As shown in an image 425, when the user desires to make the avatar move to the left, the user may cause a first contact to occur as indicated by an arrow indicator with respect to the first contact sensor 411.

Specifically, the user may cause a right-to-left contact to occur on the first contact sensor 411 using a finger and the like.

In this case, the first contact sensor 411 may sense the first contact to generate first contact information.

The validity decision unit may determine whether the first contact information is valid contact information.

When the first contact information is determined to be the valid contact information, the input signal generator may analyze the first contact information to generate an input signal with respect to the display device.

The motion information generator may estimate a motion of the avatar as a motion of moving to the left by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may move to the left.

Examples of various motion types of the avatar based on a contact type occurring on the first contact sensor 411 and the second contact sensor 412 have bee described above.

However, in addition to the aforementioned examples, there may be various types of examples of the input device 410.

For example, as shown in images 426 through 429 of FIG. 4B, the input device 410 may control various types of motions of the avatar such as a motion of moving to the right, a motion of yawing based on the Z axis, a motion of rolling based on the Y axis, a motion of pitching based on the X axis, and the like according to a contact type occurring on the first contact sensor 411 and the second contact sensor 412.

Also, according to exemplary embodiments, when the first contact and the second contact simultaneously occur on the first contact sensor 411 and the second contact sensor 412, the input device 410 may control the motion of the avatar according to the first contact and the second contact.

For example, when the first contact with respect to the motion of moving forward occurs on the first contact sensor 411 and the second contact with respect to the fly-on or height-up motion occurs on the second contact sensor 412, the input signal generator may generate the input signal including motion information based on first contact information and second contact information. Here, the motion information may be used to make the avatar exhibit a fly-on motion while moving forward.

Figure 5A:
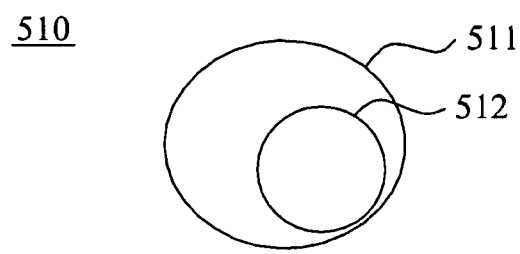
FIGS. 5A and 5B illustrate an input device and examples for describing an operation of an input device according to still other exemplary embodiments.
Figure 5B:
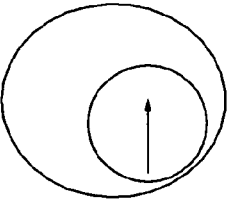
Figure 5B:
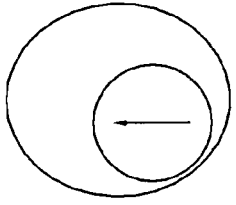
Figure 5B:
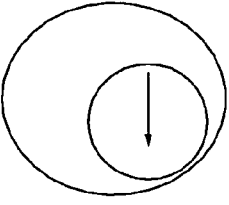
Figure 5B:
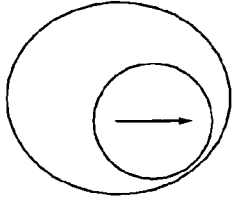
Figure 5B:
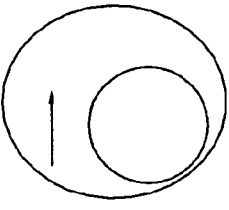
Figure 5B:
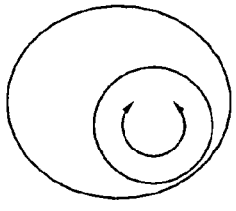
Figure 5B:
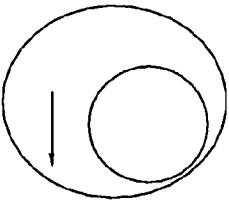
Figure 5B:
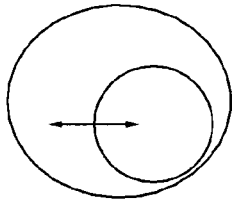
Figure 5B:
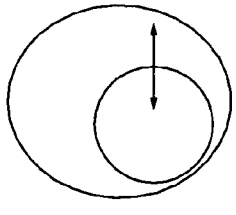

FIGS. 5A and 5B illustrate an input device 510 and examples for describing an operation of the input device 510 according to exemplary embodiments.

FIG. 5A illustrates a structure of the input device 510 according to exemplary embodiments, and FIG. 5B illustrates motion types 520 of an object controllable via the input device 510.

As shown in FIG. 5A, the input device 510 may be constructed into two planar regions, for example, may be constructed in a spherical shape, or two circular regions, or two square regions. A first contact sensor 511 may be constructed by forming a side surface of the spherical shape to be planar. The remaining portion of the spherical shape may be formed as a second contact sensor 512.

Hereinafter, a process where a user manipulates, via the input device 510, an object displayed on a display device will be described in detail with reference to FIG. 5B.

Here, it is assumed that the object displayed on the display device is an avatar existing in a virtual 3D space and the user manipulates the avatar via the input device.

As shown in an image 521, when the user desires to make the avatar move forward, the user may cause a first contact to occur as indicted by an arrow indicator with respect to the first contact sensor 511.

Specifically, the user may cause a bottom-to-top contact to occur on the first contact sensor 511 using a finger and the like.

In this case, the first contact sensor 511 may sense the first contact to generate first contact information.

According to exemplary embodiments, the input device 510 may further include a validity decision unit (not shown) to determine whether the first contact information is valid contact information.

An input signal generator (not shown) may analyze the first contact information to generate an input signal with respect to the display device.

According to exemplary embodiments, the input signal generator may further include a motion information generator (not shown).

The motion information generator may estimate a motion of the avatar as a motion of moving forward by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, a transmitter (not shown) may transmit the input signal to the display device.

The display device may control the motion of the avatar based on the input signal, so that the avatar may move forward.

As shown in an image 522, when the user desires to make the avatar move backward, the user may cause a first contact to occur as indicated by an arrow indicator with respect to the first contact sensor 511.

Specifically, the user may cause a top-to-bottom contact to occur on the first contact sensor using a finger and the like.

In this case, the first contact sensor 511 may sense the first contact to generate first contact information.

The validity decision unit may determine whether the first contact information is valid contact information.

When the first contact information is determined to be the valid contact information, the input signal generator may analyze the first contact information to generate an input signal with respect to the display device.

The motion information generator may estimate a motion of the avatar as a motion of moving backward by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control a motion of the avatar based on the input signal, so that the avatar may move backward.

As shown in an image 523, when the user desires to make the avatar exhibit a fly-on or height-up motion, the user may cause a second contact to occur as indicated by an arrow indicator with respect to the second contact sensor 512.

Specifically, the user, using a finger and the like on the second contact sensor 512, may cause a contact of sliding up to occur, from bottom to top on the input device 510.

In this case, the second contact sensor 512 may sense the second contact to generate second contact information.

The validity decision unit may determine whether the second contact information is valid contact information.

When the second contact information is determined to be the valid contact information, the input signal generator may analyze the second contact information to generate an input signal with respect to the display device.

The motion information generator may estimate a motion of the avatar as a fly-on or height-up motion by tracking a location of the second contact at predetermined time intervals based on the second contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may exhibit a fly-on or height-up motion.

As shown in an image 524, when the user desires to make the avatar exhibit a fly-off or height-down motion, the user may cause a second contact to occur as indicated by an arrow indicator with respect to the second contact sensor 512.

Specifically, the user, using a finger and the like on the second contact sensor 512, may cause a contact of sliding down to occur, from top to bottom on the input device 510.

In this case, the second contact sensor 512 may sense the second contact to generate second contact information.

The validity decision unit may determine whether the second contact information is valid contact information.

When the second contact information is determined to be the valid contact information, the input signal generator may analyze the second contact information to generate an input signal with respect to the display device.

The motion information generator may estimate a motion of the avatar as a fly-off or a height-down motion by tracking a location of the second contact at predetermined time intervals based on the second contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may exhibit a fly-off motion.

As shown in an image 525, when the user desires to make the avatar move to the left, the user may cause a first contact to occur as indicated by an arrow indicator with respect to the first contact sensor 511.

Specifically, the user may cause a right-to-left contact to occur on the first contact sensor 511 using a finger and the like.

In this case, the first contact sensor 511 may sense the first contact to generate first contact information.

The validity decision unit may determine whether the first contact information is valid contact information.

When the first contact information is determined to be the valid contact information, the input signal generator may analyze the first contact information to generate an input signal with respect to the display device.

The motion information generator may estimate a motion of the avatar as a motion of moving to the left by tracking a location of the first contact at predetermined time intervals based on the first contact information.

By referring to a table including at least one motion information of the avatar, the motion information generator may generate motion information associated with the motion of the avatar from information associated with the estimated motion of the avatar.

Here, the input signal may include the motion information.

Once the input signal generator generates the input signal, the transmitter may transmit the input signal to the display device.

The display device may control the motion of the avatar based on the input signal, so that the avatar may move to the left.

Examples of various motion types of the avatar based on a contact type occurring on the first contact sensor 511 and the second contact sensor 512 have bee described above.

However, in addition to the aforementioned examples, there may be various types of examples of the input device 510.

For example, as shown in images 526 through 529 of FIG. 5B, the input device 510 may control various types of motions of the avatar such as a motion of moving to the right, a motion of yawing based on the Z axis, a motion of rolling based on the Y axis, a motion of pitching based on the X axis, and the like according to a contact type occurring on the first contact sensor 511 and the second contact sensor 512.

Also, according to exemplary embodiments, when the first contact and the second contact simultaneously occur on the first contact sensor 511 and the second contact sensor 512, the input device 510 may control the motion of the avatar according to the first contact and the second contact.

For example, when the first contact with respect to the motion of moving forward occurs on the first contact sensor 511 and the second contact with respect to the fly-on or height-up motion occurs on the second contact sensor 512, the input signal generator may generate the input signal including motion information based on first contact information and second contact information. Here, the motion information may be used to make the avatar exhibit a fly-on motion while moving forward.

Figure 6:
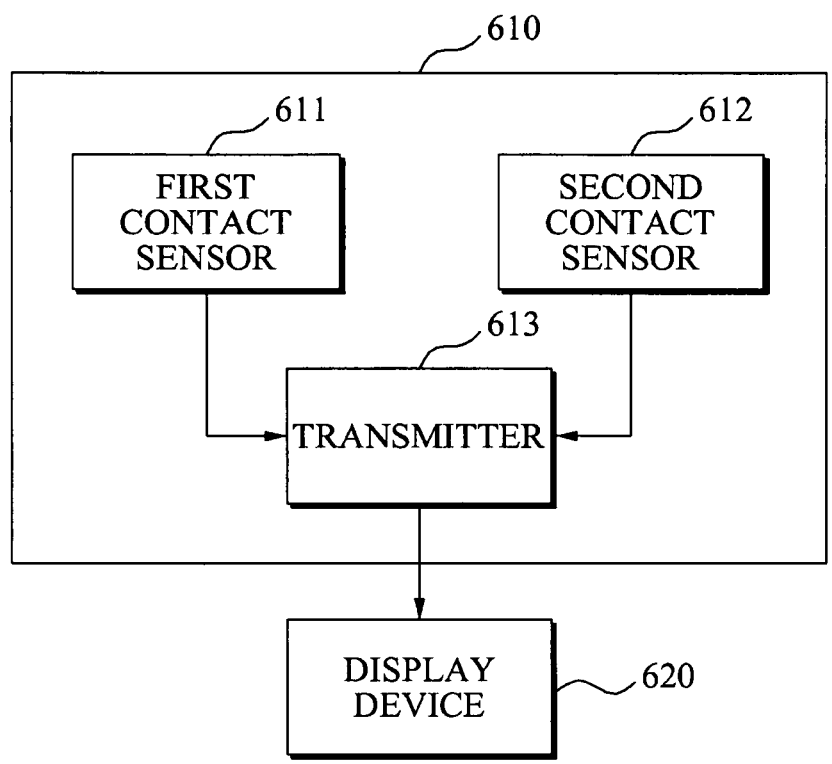
FIG. 6 is a block diagram illustrating a configuration of an input device according to other exemplary embodiments.

FIG. 6 is a block diagram illustrating a configuration of an input device 610 according to other exemplary embodiments.

The input device 610 may generate contact information including at least one of first contact information and second contact information, and transmit the generated contact information to a display device 620. The display device 620 may analyze the contact information and control a displayed object.

Specifically, the input device 610 may correspond to the input device 110 of FIG. 1. In this instance, the input device 110 may directly control the displayed object, whereas the input device 610 may transmit the contact information to the display device 620 so that the display device 620 may analyze the contact information and control the displayed object.

A first contact sensor 611 may sense a first contact occurring along a planar coordinate axis among 3D spatial coordinate axes and generate first contact information. A second contact sensor 612 may sense a second contact occurring along a vertical coordinate axis among the 3D spatial coordinate axes and generate second contact information.

A transmitter 613 may transmit contact information including at least one of the first contact information and the second contact information to the display device 620. When the contact information is received from the input device 610, the display device 620 may analyze the contact information and control the object that is displayed on the display device 620.

According to exemplary embodiments, the display device 620 may generate motion information associated with a motion of the object from the contact information, by referring to a table including at least one predetermined motion information, and control the object based on the motion information.

In this instance, the display device 620 may estimate the motion of the object by tracking at least one location of a location of the first contact and a location of the second contact at predetermined time intervals based on the contact information, and generate the motion information from the estimated motion of the object, by referring to the table.

The input device 610 according to other exemplary embodiments has been described above. General operations of the input device 610 and the display device 620 may be nearly the same as the aforementioned general operations of the input device 110 and the display device 120 of FIG. 1. Accordingly, further detailed descriptions related thereto will be omitted here.

Figure 7:
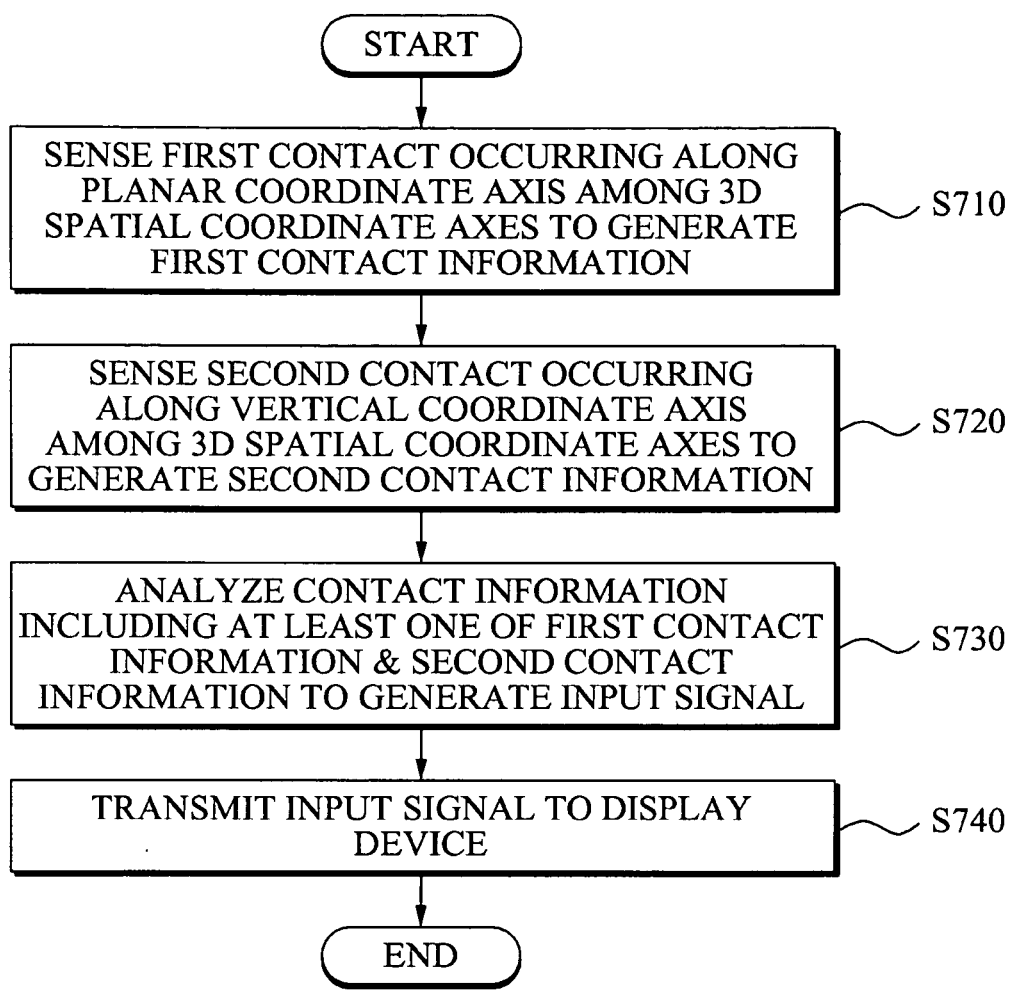
FIG. 7 is a flowchart illustrating an input method according to exemplary embodiments.

FIG. 7 is a flowchart illustrating an input method according to exemplary embodiments.

In operation S710, the input method may sense a first contact occurring along a planar coordinate axis among 3D spatial coordinate axes to generate first contact information.

In operation S720, the input method may sense a second contact occurring along a vertical coordinate axis among the 3D spatial coordinate axes to generate second contact information.

In operation S730, the input method may analyze contact information including at least one of the first contact information and the second contact information to generate an input signal with respect to a predetermined display device.

According to exemplary embodiments, operation S730 may further include generating motion information associated with a motion of the object from the contact information, by referring to a table including at least one predetermined motion information.

The input signal may include the motion information.

Also, according to exemplary embodiments, the generating of the motion information may include estimating the motion of the object by tracking at least one location of a location of the first contact and a location of the second contact at predetermined time intervals based on the contact information, and generating the motion information from the estimated motion of the object, by referring to the table.

Also, according to exemplary embodiments, the input method may further include determining whether the first contact information and the second contact information are valid contact information, prior to operation S730.

In operation S740, the input method may transmit the generated input signal to the display device.

When the input signal is received, the display device may control an object that is displayed on the display device based on the input signal.

Figure 8:
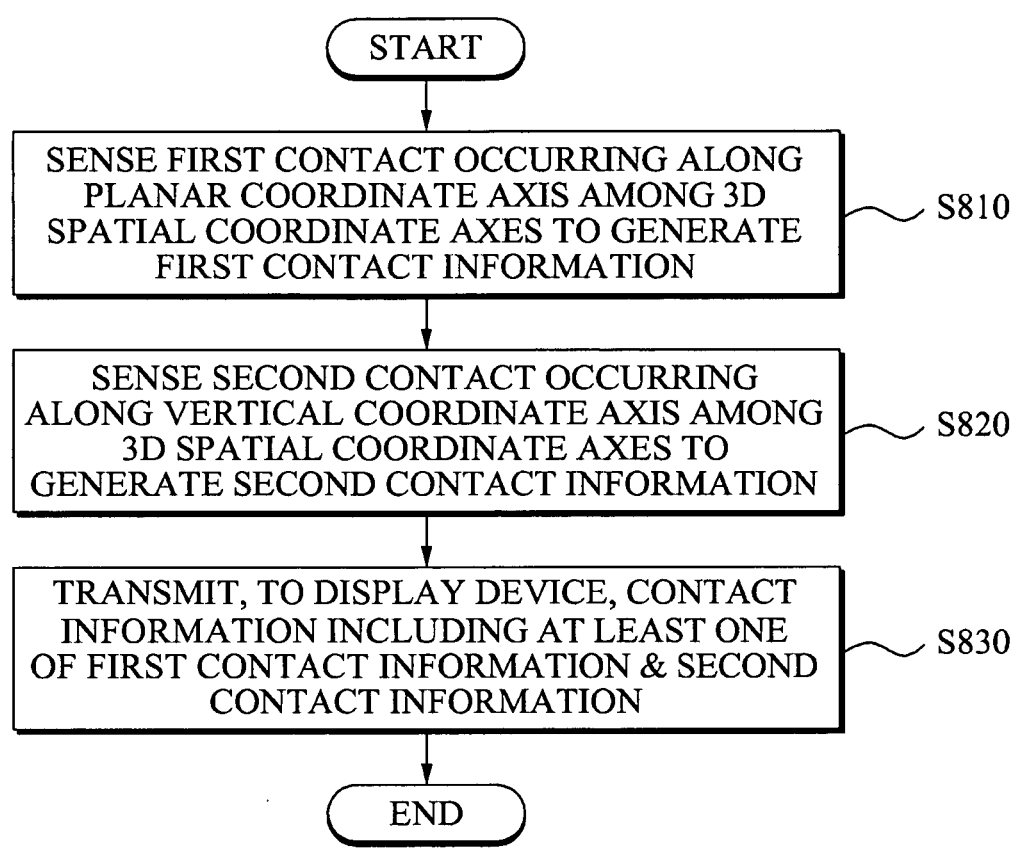
FIG. 8 is a flowchart illustrating an input method according to other exemplary embodiments.

FIG. 8 is a flowchart illustrating an input method according to other exemplary embodiments.

In operation S810, the input method may sense a first contact occurring along a planar coordinate axis among 3D spatial coordinate axes to generate first contact information.

In operation S820, the input method may sense a second contact occurring along a vertical coordinate axis among the 3D spatial coordinate axes to generate second contact information.

In operation S830, the input method may transmit, to a display device, contact information including at least one of the first contact information and the second contact information.

When the contact information is received, the display device may analyze the contact information and control an object that is displayed on the display device.

According to exemplary embodiments, the display device may generate motion information associated with a motion of the object from the contact information, by referring to a table including at least one predetermined motion information, and control the object based on the motion information.

In this instance, the display device may estimate the motion of the object by tracking at least one location of a location of the first contact and a location of the second contact at predetermined time intervals based on the contact information, and generate the motion information from the estimated motion of the object by referring to the table.

Exemplary embodiments of the input method have been described above with reference to FIGS. 7 and 8. Exemplary embodiments of FIGS. 7 and 8 are the same as or similar to exemplary embodiments of the input device described above with reference to FIGS. 1 through 6, and thus further detailed descriptions will be omitted here.

The input method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be executed and/or embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

According to exemplary embodiments, there may be provided an input device and an input method that may sense a contact occurring along a planar coordinate axis and a contact occurring along a vertical coordinate axis among 3D spatial coordinate axes, and thereby may manipulate an object that is displayed on a displayed device. Through this, it is possible to provide a user with an intuitive input interface.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. An input device comprising:
   a first contact sensor to sense a first contact occurring along a planar coordinate axis among three-dimensional (3D) spatial coordinate axes and to generate first contact information;
   a second contact sensor to sense a second contact occurring along a vertical coordinate axis among the 3D spatial coordinate axes and to generate second contact information; and
   an input signal generator, implemented in at least one processing device, configured to analyze contact information including at least one of the first contact information and the second contact information, and to generate an input signal to control a predetermined display device along six degrees of freedom of movement in a virtual three-dimensional space based on the analyzed contact information,
   wherein the analyzing of only contact information corresponding to the first contact sensor includes determining three degrees of freedom from among the six degrees of freedom,
   wherein the analyzing of contact information corresponding to the second contact sensor includes determining a plurality of degrees of freedom which include at least all remaining degrees of freedom of the six degrees of freedom,
   wherein the first contact sensor and the second contact sensor are located on different surfaces, and
   wherein the three degrees of freedom comprise two translational degrees of freedom and one rotational degree of freedom.

2. The input device of claim 1, further comprising:
   a transmitter to transmit the generated input signal to the display device.

3. The input device of claim 2, wherein the transmitted input signal controls an object that is displayed on the display device.

4. The input device of claim 3, wherein:
   the input signal generator further comprises a motion information generator to generate motion information associated with a motion of the displayed object from the contact information, by referring to a table including at least one predetermined motion information, and
   the input signal comprises the motion information.

5. The input device of claim 4, wherein the motion information generator estimates the motion of the displayed object by tracking at least one location of a location of the first contact and a location of the second contact at predetermined time intervals based on the contact information, and generates the motion information from the estimated motion of the displayed object, by referring to the table.

6. The input device of claim 1, further comprising:
   a validity decision unit to determine whether the first contact information and the second contact information are valid contact information.

7. An input method comprising:
   sensing a first contact occurring on a first surface along a planar coordinate axis among 3D spatial coordinate axes to generate first contact information;
   sensing a second contact occurring on a second surface along a vertical coordinate axis among the 3D spatial coordinate axes to generate second contact information; and
   analyzing, using at least one processing device, contact information including at least one of the first contact information and the second contact information to generate an input signal to control a predetermined display device along six degrees of freedom of movement in a virtual three-dimensional space,
   wherein the analyzing of only contact information corresponding to the first contact sensor includes determining three degrees of freedom from among the six degrees of freedom, and
   wherein the analyzing of contact information corresponding to the second contact sensor includes determining a plurality of degrees of freedom which include at least all remaining degrees of freedom of the six degrees of freedom, and
   wherein the three degrees of freedom comprise two translational degrees of freedom and one rotational degree of freedom.

8. The method of claim 7, further comprising:
   transmitting the generated input signal to the display device.

9. The method of claim 8, wherein the transmitted input signal controls an object that is displayed on the display device.

10. The method of claim 9, wherein:
    the generating of the input signal further comprises generating motion information associated with a motion of the displayed object from the contact information, by referring to a table including at least one predetermined motion information, and
    the input signal comprises the motion information.

11. The method of claim 10, wherein the generating of the motion information comprises estimating the motion of the displayed object by tracking at least one location of a location of the first contact and a location of the second contact at predetermined time intervals based on the contact information, and generating the motion information from the estimated motion of the displayed object, by referring to the table.

12. The method of claim 9, further comprising:
    determining whether the first contact information and the second contact information are valid contact information.

13. A non-transitory computer-readable recording medium comprising computer readable code to control at least one processing device to implement the method of claim 7.

14. The input device of claim 1, wherein
    the input device is constructed in a spherical shape having a planar surface;
    the planar surface comprises the first contact sensor; and
    the remainder of the surface of the spherical shape comprises the second contact sensor.

15. The input device of claim 1, wherein
    the second contact sensor provides contact information for three degrees of freedom of movement of the six degrees of freedom.

16. The input device of claim 1, wherein
    the six degrees of freedom of movement comprise linear movement along a y axis, linear movement along an x axis, linear movement along a z axis, roll based on rotational movement about the y axis, pitch based on rotational movement about the x axis, and yaw based on rotational movement about the z axis;
    the first contact sensor provides contact information for the linear movement along the y axis, the yaw based on rotational movement about the z axis, and the linear movement along the x axis; and
    the second contact sensor provides contact information for the linear movement along the z axis, the roll based on rotational movement about the y axis, and the pitch based on rotational movement about the x axis.

17. The input device of claim 1,
    wherein the analyzing of the contact information corresponding to the second contact sensor includes determining at least one translational degree of freedom and at least two rotational degrees of freedom for the second contact sensor.

18. The method of claim 1, wherein the analyzing of the contact information corresponding to the first contact sensor includes determining at least one translational degree of freedom and at least one rotational degree of freedom for the first contact sensor.

19. The method of claim 7, wherein
    the second contact information provides contact information for three degrees of freedom of movement of the six degrees of freedom.

20. The method of claim 7, wherein
    the six degrees of freedom of movement comprise linear movement along a y axis, linear movement along an x axis, linear movement along a z axis, roll based on rotational movement about the y axis, pitch based on rotational movement about the x axis, and yaw based on rotational movement about the z axis;
    the first contact information provides contact information for the linear movement along the y axis, the yaw based on rotational movement about the z axis, and the linear movement along the x axis; and
    the second contact information provides contact information for the linear movement along the z axis, the roll based on rotational movement about the y axis, and the pitch based on rotational movement about the x axis.

* * * * *